United States Patent
Shaked

(10) Patent No.: US 10,404,334 B2
(45) Date of Patent: Sep. 3, 2019

(54) PREDISTORTION FOR HYBRID DIGITAL/ANALOG PRECODERS

(71) Applicant: Maxlinear Asia Singapore PTE LTD, Singapore (SG)

(72) Inventor: Ronen Shaked, Kfar-Saba (IL)

(73) Assignee: Maxlinear Asia Singapore PTE LTD, Singapore (SG)

( * ) Notice: Subject to any disclaimer, the term of this patent is extended or adjusted under 35 U.S.C. 154(b) by 0 days.

(21) Appl. No.: 16/146,363

(22) Filed: Sep. 28, 2018

(65) Prior Publication Data
US 2019/0044585 A1  Feb. 7, 2019

Related U.S. Application Data

(63) Continuation of application No. 15/671,523, filed on Aug. 8, 2017, now Pat. No. 10,135,505, which is a
(Continued)

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0456* (2013.01); *H04B 7/0617* (2013.01);
(Continued)

(58) Field of Classification Search
CPC .. H04B 7/0417; H04B 7/0617; H04B 7/0456; H04L 25/03891; Y02D 70/00; Y02D 70/144; Y02D 70/142
See application file for complete search history.

(56) References Cited

U.S. PATENT DOCUMENTS 8,565,345 B2  10/2013  Gupta
9,742,446 B2   8/2017  Yang
(Continued)

*Primary Examiner* — Vineeta S Panwalkar
(74) *Attorney, Agent, or Firm* — McAndrews, Held & Malloy, Ltd.

(57) ABSTRACT

A 5G base station transmitter at least partially precodes data for beam forming, and generates digital precoded baseband signals. Cross product circuitry coupled to the digital precoder, generates digital cross products of the digital precoded baseband signals. Both the baseband signals and the cross products are put through digital-to-analog converters (DACs), then provided to an analog non-linear precoder. The analog non-linear precoder combines the analog baseband signals, the cross products, with pre-distortion and precoder coefficients to generate a signal that is pre-compensated for power amplifier non-linearity. The pre-compensated signal is amplified by the power amplifier and transmitted via a phased antenna array. The number of extra DACs required for inserting pre-distortion when a hybrid digital/analog precoder is used can be limited to approximately $$\frac{N_{RF}(N_{RF}-1)}{2},$$

where $N_{RF}$ is the number of outputs of the digital precoder. This is significantly fewer than the number of extra DACs used by other methods.

18 Claims, 7 Drawing Sheets

Related U.S. Application Data continuation of application No. 15/171,198, filed on Jun. 2, 2016, now Pat. No. 9,762,302.

(60) Provisional application No. 62/344,072, filed on Jun. 1, 2016.

(51) Int. Cl.
*H04L 25/03* (2006.01)
*H04B 7/0456* (2017.01)

(52) U.S. Cl.
CPC ........ *H04L 25/03891* (2013.01); *Y02D 70/00* (2018.01); *Y02D 70/142* (2018.01); *Y02D 70/144* (2018.01)

(56) References Cited

U.S. PATENT DOCUMENTS

| | | | |
|---|---|---|---|
| 9,762,302 B1 | 9/2017 | Shaked | |
| 2003/0184372 A1* | 10/2003 | Fudaba | H03F 1/3241 330/149 |
| 2010/0166098 A1* | 7/2010 | Luz | H04B 7/0413 375/267 |
| 2011/0096865 A1 | 4/2011 | Hori et al. | |
| 2011/0235748 A1 | 9/2011 | Kenington | |
| 2018/0375480 A1* | 12/2018 | Rollins | H03F 1/3247 |

* cited by examiner

MIMO transceiver

PREDISTORTION FOR HYBRID DIGITAL/ANALOG PRECODERS

CROSS-REFERENCE TO RELATED APPLICATIONS

The present Patent Application is a continuation of U.S. patent application Ser. No. 15/671,523, filed Aug. 8, 2017, which is a continuation of U.S. patent application Ser. No. 15/171,198, filed Jun. 2, 2016 (now U.S. Pat. No. 9,762,302), which claims priority to U.S. provisional patent application 62/344,072, filed Jun. 1, 2016. Each of these applications is hereby incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to multi-antenna arrays, and more particularly to adding pre-distortion in systems including hybrid digital/analog precoders.

Description of Related Art

Communication systems are known to support wireless and wireline communications between wireless and/or wireline communication devices. Such communication systems range from national and/or international cellular telephone systems, to the Internet, to point-to-point in-home wireless networks. Each type of communication system is constructed, and hence operates, in accordance with one or more communication standards. For instance, wireless communication systems may operate in accordance with one or more standards including, but not limited to IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to one or more antennas, and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Some RF transmitters, including those used in many Wi-Fi base stations, employ an antenna technology called multiple input/multiple output (MIMO) in which multiple antennas are used for sending and receiving more than one data signal simultaneously over the same radio channel by exploiting multipath propagation. In addition, beamforming techniques can be used to achieve spatial selectivity. In general, beam forming can be performed by precoding data streams before sending the data streams to an antenna array, which often includes hundreds of antennas.

The next generation (5G) architecture of cellular base station will transmit dozens of high capacity data streams to multiple users using MIMO techniques (MU-MIMO) by forming a dedicated beam towards each user. The beam forming is done by precoding each of the data streams prior to reaching the hundreds (N) of antenna elements.

Power consumption constraints on an MU-MIMO base stations will require transmit power amplifiers to become more efficient, that is be able to transmit linearly with higher power, but at the same time avoiding increasing power consumption. Unfortunately, power amplifiers generally have a non-linear response when operating at higher amplification levels, resulting in increased power consumption for a given transmit power at higher amplification levels.

It is known to add pre-distortion compensation into the digital transmit path of an RF transmitter, specifically by adding digital pre-distortion after an all-digital precoder, but before the digital to analog converters used to convert the digital signals for use in the analog transmit path. It will be appreciated that hybrid analog/digital precoders are often preferred over all-digital precoders for 5G and other systems with large antenna arrays, because hybrid analog/digital precoders generally use fewer RF chains, thereby avoiding energy consumption associated with mixed signal components, and can provide reduced baseband processing complexity. Unfortunately, for hybrid analog/digital precoders, digital pre-distortion cannot be efficiently implemented using the same techniques used for all-digital precoders.

BRIEF DESCRIPTION OF THE SEVERAL VIEWS OF THE DRAWING(S)

DETAILED DESCRIPTION OF THE INVENTION

In 5G and other systems employing large antenna arrays, each antenna element is preceded by a power amplifier (PA). The input signal to each PA can be a linear combination of "s" signals (and "s" could be up to dozens of signals). Theoretically, therefore the asymptotic peak-to-average-power-ration (PAPR) of the summed signal increases to 10*log 10(s), which could asymptotically reach up to 10 dB for 10 signals. Maximizing power efficiency can, therefore, be a significant design factor, especially considering that a 5G base station may be a small form box mounted on street furniture.

In various embodiments, the power efficiency of a 5G or other multi-antenna RF transmitter employing a hybrid digital/analog precoder for beam forming, can be improved by using an analog non-linear precoder to insert digital pre-distortion into an RF signal prior to sending that signal to the power amplifier. The outputs of a digital precoder, referred to as baseband signals, along with cross products of those outputs, can be converted from digital to analog using digital-to-analog converters (DACs), and transmitted to the analog non-linear precoder. In various embodiments, the analog non-linear precoder also receives precoder and pre-distortion coefficients. The precoder and pre-distortion coefficients are combined with the baseband signals and the cross products to generate a pre-compensated signal, which is sent to a power amplifier, then to an antenna array for RF transmission. The use of cross products and baseband signals can be used to significantly reduce the number of digital-to analog converters (DACs) required, as compared to other methods of introducing pre-distortion in systems employing a hybrid digital/analog precoder.

Figure 1:
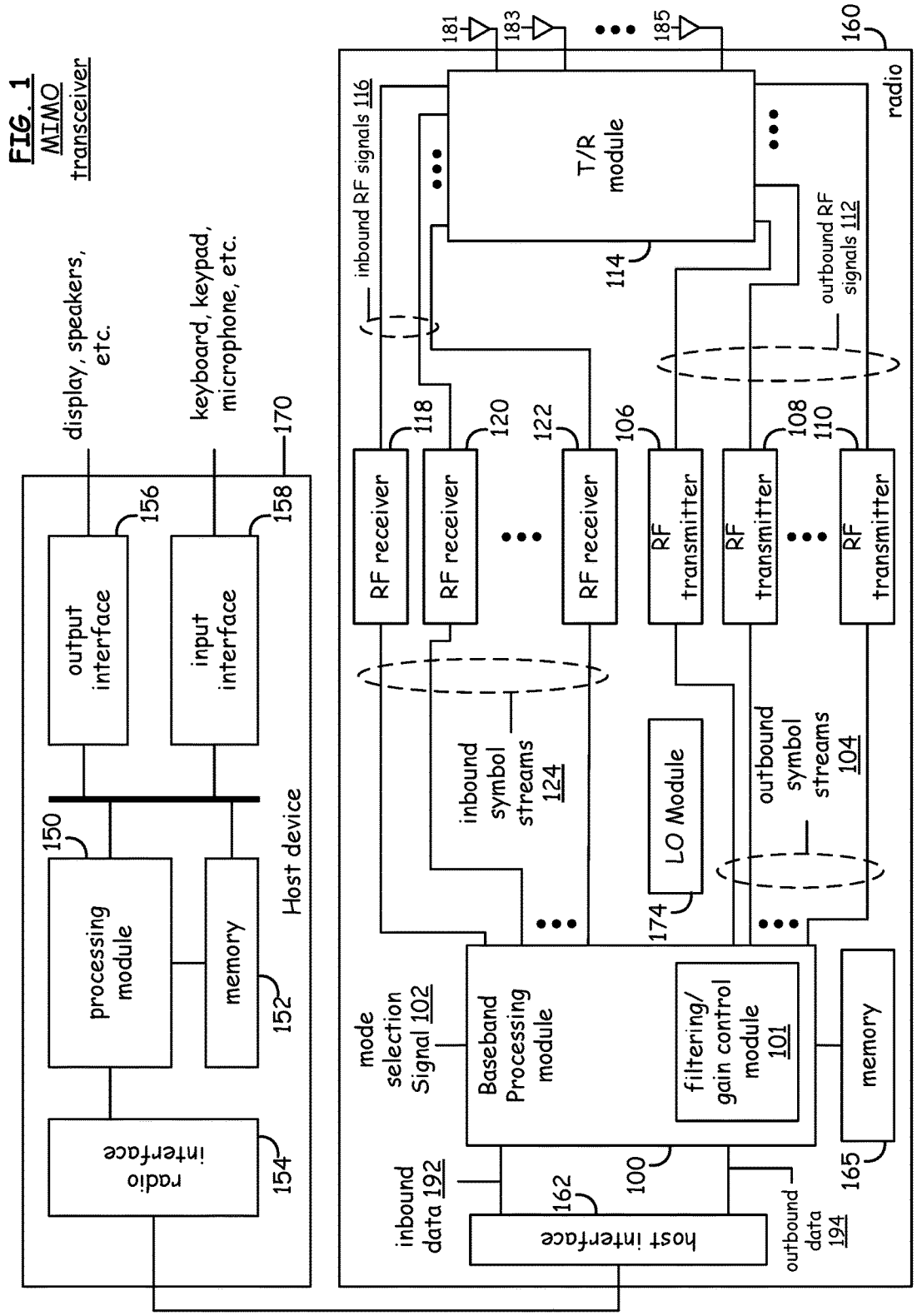
FIG. 1 is a block diagram illustrating a multiple input/multiple output (MIMO) radio transceiver, according to various embodiments of the present disclosure.

FIG. 1 is a schematic block diagram illustrating a wireless communication device that includes a host device 170, such as an access point or base station, and an associated radio 160. For cellular telephone hosts, the radio 160 is a built-in component. For personal digital assistants hosts, laptop hosts, and/or personal computer hosts, the radio 160 may be built-in or an externally coupled component.

As illustrated, the host device 170 includes a processing module 150, memory 152, radio interface 154, input interface 158, and output interface 156. The processing module 150 and memory 152 execute the corresponding instructions that are typically done by the host device. For example, for a cellular telephone host device, the processing module 150 performs the corresponding communication functions in accordance with a particular cellular telephone standard.

The radio interface 154 allows data to be received from and sent to the radio 160. For data received from the radio 160 (e.g., inbound data 192), the radio interface 154 provides the data to the processing module 150 for further processing and/or routing to the output interface 156. The output interface 156 provides connectivity to an output display device such as a display, monitor, speakers, etc., such that the received data may be displayed. The radio interface 154 also provides data from the processing module 150 to the radio 160. The processing module 150 may receive the outbound data from an input device such as a keyboard, keypad, microphone, etc., via the input interface 158 or generate the data itself. For data received via the input interface 158, the processing module 150 may perform a corresponding host function on the data and/or route it to the radio 160 via the radio interface 154.

Radio 160 includes a host interface 162, a baseband processing module 100, memory 165, a plurality of radio frequency (RF) transmitters 106-110, a transmit/receive (T/R) module 114, a plurality of antennas 181-185, a plurality of RF receivers 118-120, and a local oscillation module 174. The baseband processing module 100, in combination with operational instructions stored in memory 165, executes digital receiver functions and digital transmitter functions, respectively. Moreover, baseband processing module 100 further includes, in the described embodiment, a filtering/gain control module 101. Filtering/gain control module 101 is operable, in one embodiment, to define power spectral density masks that have specified shapes for power and gain across the bandwidth channel for different modulation schemes including orthogonal frequency division multiplexing (OFDM).

The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 165 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 160 receives outbound data 194 from the host device via the host interface 162. The baseband processing module 100 receives the outbound data 194 and, based on a mode selection signal 102, produces one or more outbound symbol streams 104. The mode selection signal 102 can indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM, and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 194. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3, or 4 antennas, the baseband processing module 100 will produce 2, 3, or 4 outbound symbol streams 104 from the outbound data 194.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency band pass filter. The RF transmitters 106-110 provide the outbound RF signals 112 to the transmit/receive module 114, which provides each outbound RF signal to a corresponding antenna 181-185.

When the radio 160 is in the receive mode, the transmit/receive module 114 receives one or more inbound RF signals 116 via the antennas 181-185 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 192, which is provided to the host device 170 via the host interface 162.

As one of average skill in the art will appreciate, the wireless communication device of FIG. 1 may be implemented using one or more integrated circuits. For example, the host device 170 may be implemented on a first integrated circuit, the baseband processing module 100 and memory 165 may be implemented on a second integrated circuit, and the remaining components of the radio 160, less the antennas 181-185, may be implemented on a third integrated circuit. As an alternate example, the radio 160 may be implemented on a single integrated circuit. As yet another example, the processing module 50 of the host device and the baseband processing module 100 may be a common processing device implemented on a single integrated circuit. Further, the memory 152 and memory 165 may be implemented on a single integrated circuit and/or on the same integrated circuit as the common processing modules of processing module 150 and the baseband processing module 100.

Figure 2:
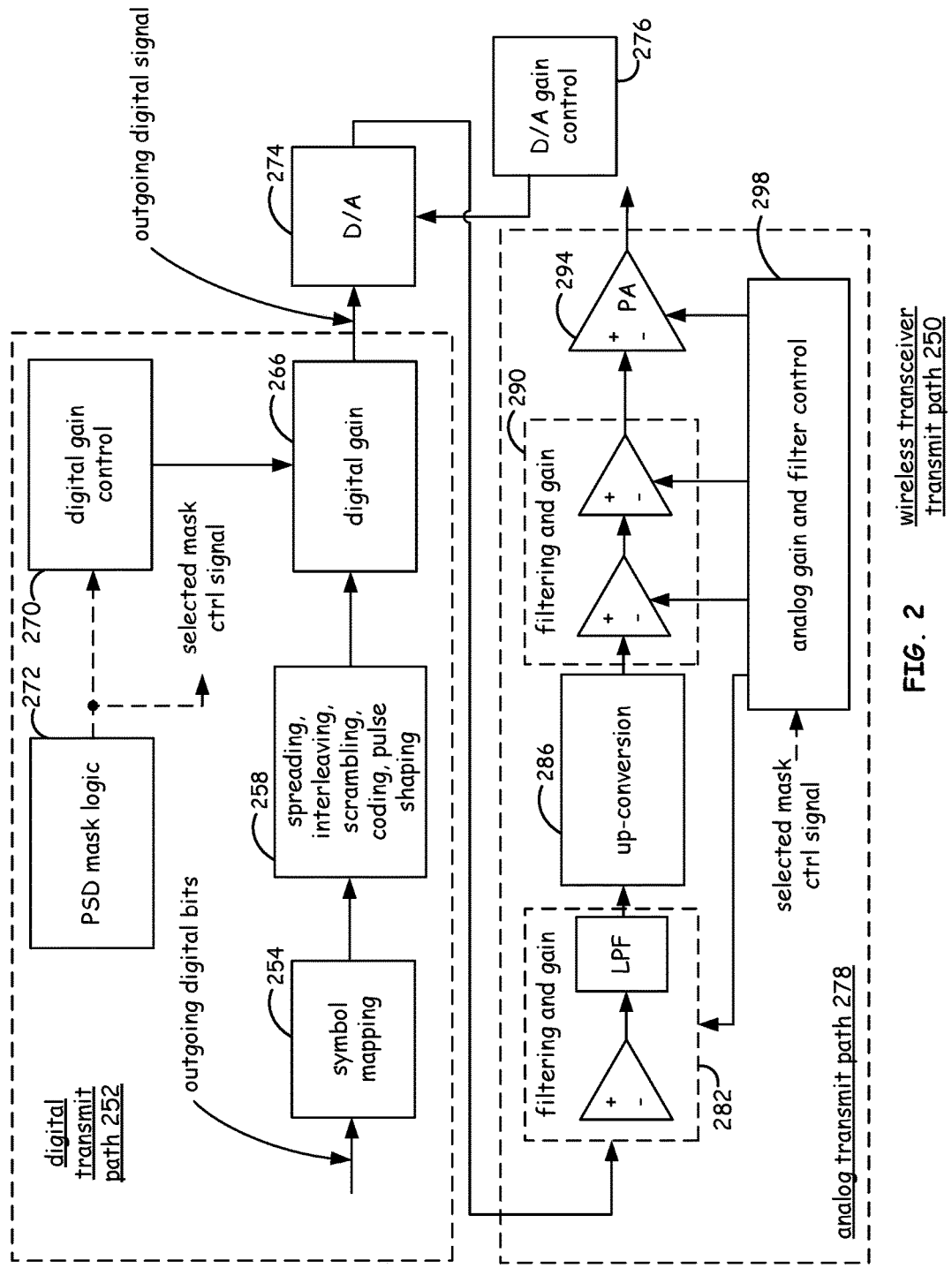
FIG. 2 is a block diagram illustrating a wireless transceiver transmit path, according to various embodiments of the present disclosure.

FIG. 2 is a functional block diagram of a wireless transceiver transmit path 250 according to one embodiment of the invention. Though not specifically shown here, a baseband or other digital processor typically produces outgoing digital data that is received and processed by a plurality of known digital processing blocks or modules (collectively, a digital transmit path 252) that includes modules such as symbol mapping module 254, and one or more modules 258 that collectively perform spreading, interleaving, scrambling, coding, and pulse shaping. It should be understood that modules of the digital transmit path comprise digital functionality that performs one or more specified functions to create a digital signal that eventually is converted to a traditional analog signal form for processing and transmission from a transmit path. Moreover, the modules and functionality listed for the digital transmit path 252 are exemplary and may be changed according to specific design requirements. Specifically, for example, some of the functionality may be removed or other functionality, such as up-sampling modules and decimation modules to modify a sample rate of the digital data may be included.

Additionally, a digital gain module 266 typically provides a specified amount of digital gain to the outgoing digital signals. Here, digital gain module 266 produces a digital gain based upon a received digital gain control signal produced by digital gain control 270 that includes logic for adjusting the digital gain as will be described in greater detail below. The outgoing digital signal produced by digital gain module 266 is then produced to a digital-to-analog conversion module 274. As may be seen, digital-to-analog conversion module 274 is also coupled to receive a gain control signal from a digital-to-analog gain control module 276. Digital-to-analog gain control module 276 is operable to adjust a gain of digital-to-analog conversion module 274 which is therefore operable to produce an outgoing analog baseband or intermediate frequency band signal for processing to and by an analog transmit path 278 having an adjustable gain level. While these gain settings technically are in the analog transmit path, they are treated separately from all other gain settings in the analog transmit path because digital-to-analog conversion module 274 effectively adjusts the gain of the input digital signal and therefore does not affect the analog transmit path distortion levels or linearity. Accordingly, references herein to adjust a digital gain specifically include adjusting the gain of digital-to-analog conversion module 274.

Analog transmit path 278 includes filtering and gain module 282, up-conversion module 286, filtering and gain module 290 and power amplifier 294. In the described embodiment, filtering and gain module 282, filtering and gain module 290 and power amplifier 294 are each operably disposed to receive gain control signals from analog gain control module 298. Moreover, the modules may comprise a plurality of modules. For example, in one embodiment, filtering and gain module 290 may comprise a plurality of high-pass variable gain amplifiers that provide amplification and high-pass filtering for an outgoing radio frequency signal that has already be up-converted from a baseband frequency signal or from an intermediate frequency signal. Analog gain control 298 is therefore operable to provide at least one of gain control and filter control to a plurality of filtering and gain control modules in the analog transmit path 278.

As may also be seen, a transmit path of the transceiver can include a signal shaping logic module 272 which is operable to select and produce an indication of a selected signal shaping scheme. The indication or control information is produced to prompt the various digital and analog gain and filtering elements of the transmit path to produce a gain/power or filter response that corresponds to the selected signal shaping scheme. The selected signal shaping scheme can be produced to digital control module 270 of digital transmit path 252 and to analog gain and filter control module 298 of analog transmit path 278. Based on the received selected mask control signal, analog gain and filter control module 298 modifies gain or signal magnitudes of one or more gain elements in the analog transmit path 278 as well as modifying filter response shaping of one or more filters.

In the described embodiment of the invention, the filters, especially the low pass filter(s), of the analog transmit path 278 have selectable filter responses to support a plurality of filter responses for a desired signal frequency spectrum or range. Moreover, high frequency filtering is performed by filtering and gain module 290 while low frequency filtering is performed by filtering and gain module 282. As such, in the embodiment of FIG. 2, analog gain and filter control module 298 is operable to produce a non-symmetric shaped signal response by separately controlling low frequency and high frequency gain as well as filtering. Analog gain control 298 is operable to provide at least one of gain control and filter control to a plurality of filtering and gain control modules in the analog transmit path 278. In general, analog gain control 298 is operable to generate control signals to support signal shaping for modules in which such signal shaping may be performed, preferably without introducing additional non-linearity or other problems with the outgoing signal. For example, while analog gain control 298 is operable to provide gain level setting to each gain module or element of the analog transmit path 278, analog gain control 298 may only provide control signals to filter and gain elements prior to the power amplifier of the analog transmit path 278. For example, signal shaping control commands may be sent to only one of filtering and gain module 282 and 290 or to both but not to power amplifier 294.

One aspect of various embodiments is the use of selected signal shaping schemes to satisfy error-vector magnitude (EVM) requirements for a given signal type. Depending on the signal type and even transmission channel, spectral re-growth may violate EVM requirements. Accordingly, in some embodiments signal shaping schemes can be used to define power spectral density requirements that account for the transmission signal type (and associated spectral flatness requirements, EVM requirements generally associated for a specific transmission signal type (e.g., 5G, 802.11 (n), (ac)). Additionally, for some signal types, based in part upon assigned signal frequency range, a selected channel for the signal may have additional EVM requirements to avoid spectral regrowth within restricted bands. Accordingly, signal magnitude, digital and analog gain, and pre-distortion compensation settings are potentially limited by a selected signal shaping scheme that is used to satisfy signal flatness and EVM requirements whether the signal is a single carrier signal or multiple carrier OFDM signal.

One aspect of the embodiments of the invention includes reducing the gain/power at the frequencies farthest from a center frequency of a modulated signal to the extent allowed by a transmission standard or protocol corresponding to a signal transmission (hereinafter "signal type"). Reducing the gain/power at the ends of the modulated signal spectrum (whether a single channel or a plurality of channels for and OFDM modulated signals) reduces out of band spectral regrowth and potential violation of EVM requirements.

In operation, digital gain control module 270, digital-to-analog gain control module 276 and analog gain and filter control module 298 collectively define a total gain of a signal being wirelessly transmitted from an antenna operably disposed to receive the output of power amplifier 294. This total gain can be based, at least in part, on the selected signal shaping scheme.

Typically, however, a limit is specified for total digital gain changes because of performance limitations of the digital to analog conversion module 274. Thus, if the gain adjustment exceeds a maximum value allowed, the gain of the analog transmit path 278 is changed to be proximate to the desired total gain (within a tolerance or range) and then the digital gain is adjusted to provide the desired total gain.

It should be understood that the transmit path of FIG. 2 is an exemplary transmit path. A radio transceiver formed according on one embodiment of the invention may include a plurality of transmit paths for a multiple in multiple out (MIMO) type radio transceiver. Some or even all of the modules may be duplicated for each transmit path according to design implementation. Such a MIMO transceiver may, for example, each transmit one or more sub-carriers of a given OFDM signal. Each of the filtering and gain modules 282 and 290, as well as digital gain control 270 and digital-to-analog gain control module 276, may jointly be represented as module 101 of FIG. 3, and may operate to support a defined shaped signal response.

Figure 3:
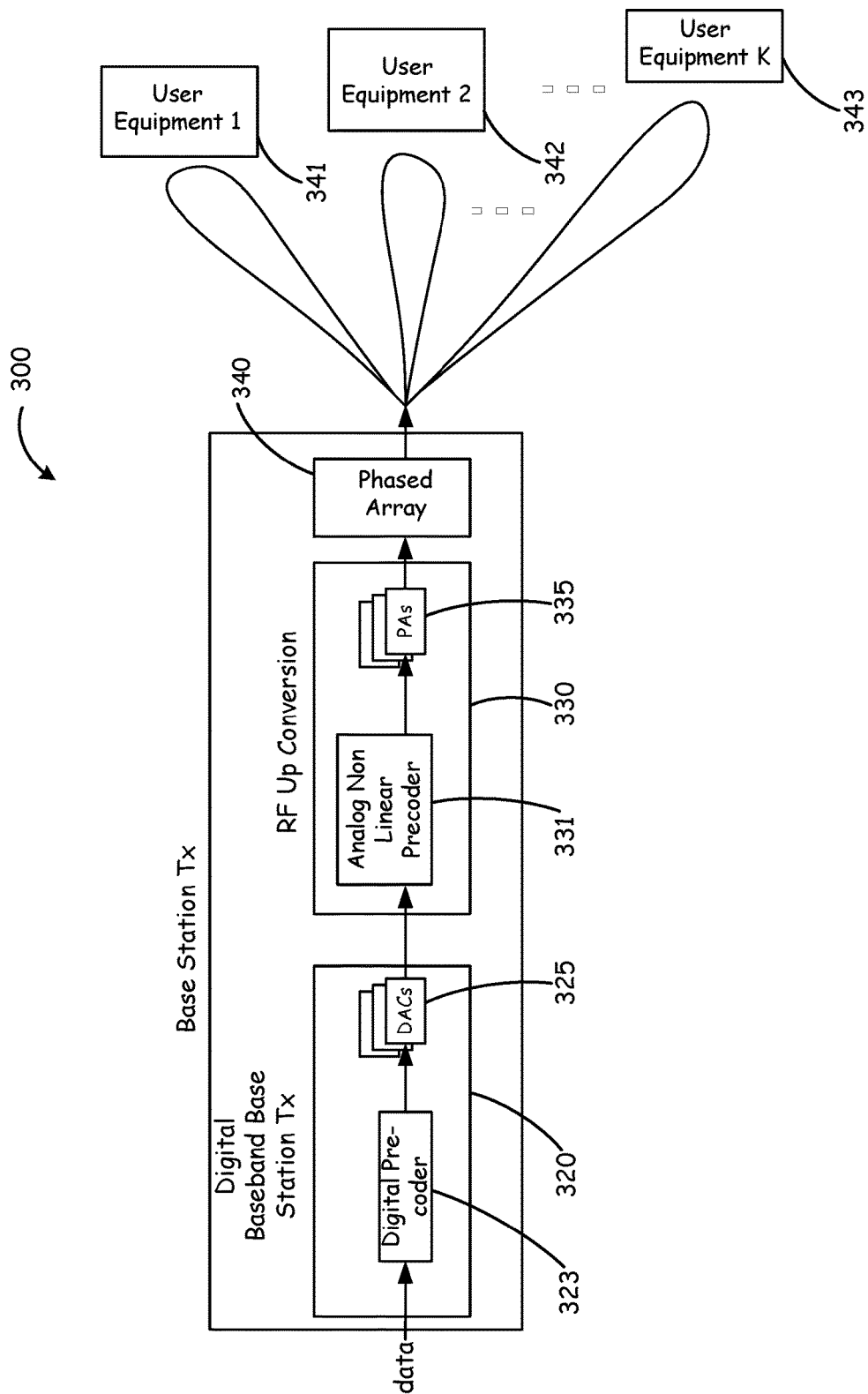
FIG. 3 is a block diagram illustrating a base station transmit path employing hybrid digital/analog precoding using an analog non-linear precoder, according to various embodiments of the present disclosure.

Referring next to FIG. 3, a base station transmit path 300 employing hybrid digital/analog precoding using an analog non-linear precoder will be discussed according to various embodiments of the present disclosure. Base station transmit path 300 includes digital baseband circuitry 320, which performs a digital portion of the pre-coding used for beam forming/shaping; RF up-conversion circuitry 330, which performs an analog portion of the precoding, inserts pre-distortion, up-converts the signal from baseband frequencies to radio frequencies, and amplifies the up-converted RF signal; and phased array 340, which transmits the RF signal to multiple user equipment 341, 342, and 343.

Digital baseband circuitry 320 includes digital precoder 323 and DACs 325. In various embodiments, digital precoder 323 is part of a hybrid digital/analog precoder, and shares the responsibility for pre-coding signals with analog non-linear precoder 331. Digital precoder 323 digitally precodes data to produce digitally precoded baseband outputs, which DACs 325 convert to analog form for use by RF up-conversion circuitry 330. Additionally, some of the calculations performed during digital precoding of the baseband outputs produce results that can be re-used by analog non-linear precoder 331 to perform the analog portion of the precoding and/or the insertion of pre-distortion.

In some embodiments, digital baseband circuitry 320 also includes a digital cross product generator (not explicitly illustrated), either separately or as part of digital precoder 323, used to generate cross products of the precoded baseband outputs. In various embodiments, enough additional DACs 325 are included in digital baseband circuitry 320 to convert the digital cross products to analog form.

RF up conversion circuitry 330 includes analog non-linear precoder 331 and power amplifiers (PAs) 335. The output of DACs 325, which can include both analog-converted baseband signals from a digital precoder and analog-converted cross-products of those baseband signals, are supplied to analog non-linear precoder 331. In some embodiments, analog non-linear precoder 331 also receives pre-distortion coefficients used to offset nonlinearity in PAs 335, precoder coefficients used to perform the analog portion of the hybrid digital/analog precoding, and some or all of the results generated by digital baseband circuitry 320 as part of the digital precoding process.

In operation, data to be transmitted is received at digital baseband circuitry 320, which uses digital precoder 323 to partially or fully precode the data for beamforming or other purposes. Digital baseband circuitry 320 can also generate cross products of the outputs of digital precoder 323 and convert the digital signals to analog signals before transferring those signals to RF up conversion 330. RF up conversion 330 completes the precoding (for example to beam form the signals), inserts pre-distortion using analog non-linear precoder 331, up converts the baseband signal to RF frequencies, and amplifies the signals using PAs 335. Phased array 340 then transmits the amplified signals to multiple receivers.

Figure 4:
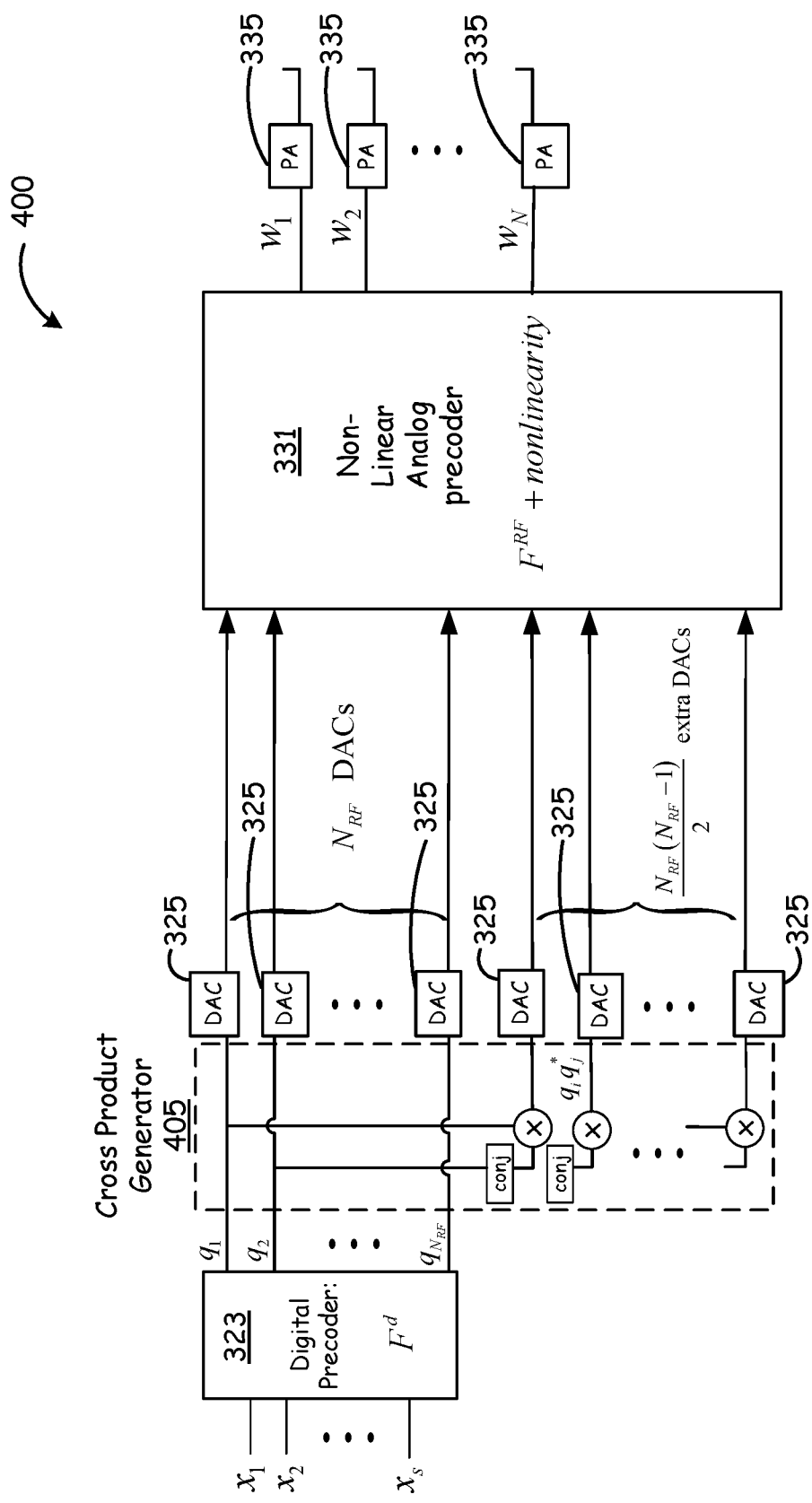
FIG. 4 is a block diagram illustrating generation of inputs for use by an analog non-linear precoder, according to various embodiments of the present disclosure.

Referring next to FIG. 4, a hybrid digital/analog precoder 400 will be discussed according to various embodiments of the present disclosure. Hybrid digital/analog precoder 400 includes digital precoder 323, which performs the digital portion of the precoding by generating digitally precoded baseband outputs; cross product generator 405, which generates cross products of the digitally precoded baseband outputs; DACs 325, which convert digital baseband and cross product signals to analog for use by analog non-linear precoder 331; and analog non-linear precoder 331 which performs the analog portion of the precoding and inserts pre-distortion in a hybrid digital/analog manner before sending the precoded, pre-distorted signal to power amplifiers 335.

In at least one embodiment, generation of the cross products as illustrated in FIG. 4 can reduce the number of DACs as compared to other methods of implementing pre-distortion in a hybrid digital/analog precoder. A mathematical derivation illustrating the savings in the number of DACs provided by various embodiments of the present disclosure will be discussed.

Starting with a basic existing transmitter with a hybrid digital-analog precoder, the digital pre-distortion (DPD) could be placed next to the power amplifiers (PAs). Next, the DPDs will be shifted from analog domain to digital domain through some mathematical manipulation. The input signals to the PAs are:

$$w_1 = DPD_1(q_1\omega_{11} + q_2\omega_{12} + \ldots + q_{N_{RF}}\omega_{1N_{RF}})$$
$$w_2 = DPD_2(q_1\omega_{21} + q_2\omega_{22} + \ldots + q_{N_{RF}}\omega_{2N_{RF}})$$
$$\ldots$$
$$w_N = DPD_N(q_1\omega_{N1} + q_2\omega_{N2} + \ldots + q_{N_{RF}}\omega_{NN_{RF}})$$

where:

$\omega_{ij}$—is the (i,j)-th coefficient in the analog precoder matrix:

$$F^{RF} = \begin{bmatrix} \cdot & \cdot & \cdot \\ \cdot & \omega_{ij} & \cdot \\ \cdot & \cdot & \cdot \end{bmatrix}_{N \times N_{RF}}$$

And $DPD_i$ represents a polynomial pre-distortion compensation function, e.g.

$$w = DPD_i(v) = v + \beta_1{}^i v|v|^2 + \beta_2{}^i v|v|^4 + \ldots$$

Without loss of generality it will be assumed that the DPD's order is up to the $3^{rd}$ order and that only two input signals $q_1$ and $q_2$ are present. Also allowing some abuse of notation the two precoder coefficients will be denoted as $\omega_1$, $\omega_2$:

$$w = DPD(\omega_1 q_1 + \omega_2 q_2) =$$
$$(\omega_1 q_1 + \omega_2 q_2) + \beta|\omega_1 q_1 + \omega_2 q_2|^2(\omega_1 q_1 + \omega_2 q_2) = (\omega_1 q_1 + \omega_2 q_2) +$$
$$\beta(|\omega_1|^2|q_1|^2 + |\omega_2|^2|q_2|^2 + 2\mathcal{R}(\omega_1\omega_2^* q_1 q_2^*))(\omega_1 q_1 + \omega_2 q_2) ==$$
$$(\omega_1 q_1 + \omega_2 q_2) + \beta(\omega_1|\omega_1|^2|q_1|^2) +$$
$$\beta(\omega_2|\omega_2|^2|q_2|^2) + +\beta\omega_1 q_1(|\omega_2|^2|q_2|^2 + 2\mathcal{R}(\omega_1\omega_2^* q_1 q_2^*)) + +$$
$$\beta\omega_2 q_2(|\omega_1|^2|q_1|^2 + 2\mathcal{R}(\omega_1\omega_2^* q_1 q_2^*)) ==$$
$$\underbrace{\omega_1 q_1 + \beta\omega_1|\omega_1|^2 q_1|q_1|^2}_{DPD \text{ on } q_1} + \underbrace{\omega_2 q_2 + \beta\omega_2|\omega_2|^2 q_2|q_2|^2}_{DPD \text{ on } q_2} + +$$
$$\underbrace{\beta\omega_1 q_1(|\omega_2|^2|q_2|^2 + 2\mathcal{R}(\omega_1\omega_2^* q_1 q_2^*)) +}_{\beta\omega_2 q_2(|\omega_1|^2|q_1|^2 + 2\mathcal{R}(\omega_1\omega_2^* q_1 q_2^*))}_{cross \, DPD}$$

The equation above equation shows how DPD coefficients ($\beta$) and precoder coefficients $\omega_i$ are integrated together into a joint block of DPD+precoder.

The above procedure indeed shifted the DPDs into digital domain, but the undesired effect of also shifting the analog precoder from analog domain to digital domain was generated—ending with an undesired penalty in the shape of increased number of DACs: Instead of just $N_{RF}$ DACs in the original hybrid architecture, there are now many more DACs ($N \gg N_{RF}$). Additionally, there are also an increased number of DPDs: Instead of N DPDs there are N☐($N_{RF}$+1) DPDs).

However, the architecture of a 5G base station with digital-analog hybrid precoder and pre-distortion functionally added in accordance with various embodiments and illustrated in FIG. 4, requires far fewer DACs, as will be explained next.

The approach in FIG. 4 adds extra $$\frac{N_{RF}(N_{RF}-1)}{2}$$

DACs on top of the basic $N_{RF}$ DACs, in order to D/A convert the cross product signals $q_i q_j^*$ for i<j. The number of such cross product signals is $$\frac{N_{RF}(N_{RF}-1)}{2}$$

because:

$$\begin{array}{cccc} q_1 q_2^* & q_2 q_3^* & \cdots & q_{N_{RF}-1} q_{N_{RF}}^* \\ q_1 q_3^* & q_2 q_4^* & & \\ \cdots & \cdots & & \\ q_1 q_{N_{RF}}^* & q_2 q_{N_{RF}}^* & & \\ \hline N_{RF}-1, & N_{RF}-2, & \cdots & 1 \quad : \text{Total} \end{array}$$

and $$(N_{RF}-1)+(N_{RF}-2)+\ldots+1 = \frac{(N_{RF}-1)N_{RF}}{2}.$$

For $N_{RF}=4$ that's an extra of 6 DACs.

Next, an assessment of the amount of extra multipliers in the non-linear analog precoder block shown in FIG. 4 follows. If no pre-distortion non-linearity functionality was assigned to the analog precoder, then it would have to simply apply $N_{RF}$ multipliers (complex multipliers) per each output signal $w_i$ i=1 . . . N ending with a total of $N_{RF} \cdot N$ multipliers. However the non-linearity assignment to the analog precoder increases the amount of multipliers according to the following count:

Looking at a single output signal $w_i$, for i=1 . . . N, the non-linear analog precoder has to implement the following multiplications tree:

$$w_i =$$

direct: $\omega_{i1} \Box q_1 + \beta \omega_{i1}|\omega_{i1}|^2 \Box q_1|q_1|^2 + \omega_{i2}\Box q_2 + \beta\omega_{i2}|\omega_{i2}|^2\Box q_2|q_2|^2 + \ldots +$ $\omega_{iN_{RF}} \Box q_{N_{RF}} + \beta\omega_{iN_{RF}}|\omega_{iN_{RF}}|^2 \Box q_{N_{RF}}|q_{N_{RF}}|^2 + +\text{cross:}$ $$\beta \Box \sum_{m=1}^{N_{RF}} \omega_{im} q_m \Box \left( \sum_{k=1, k \neq m}^{N_{RF}} |\omega_{ik}|^2 \Box |q_k|^2 + 2\mathcal{R}(\omega_{im}\omega_{ik}^* \Box q_m q_k^*) \right)$$

Similarly for the cross-product term the amount of multiplications is:

$$\sum_{k=1, k \neq m}^{N_{RF}} |\omega_{ik}|^2 \Box |q_k|^2 => N_{RF}$$

real mul=¼·$N_{RF}$ complex mul would cover all the needed combinations.

$$\sum_{k=1, k \neq m}^{N_{RF}} 2\mathcal{R}(\omega_{im}\omega_{ik}^* \Box q_m q_k^*) => (N_{RF}^2 - N_{RF})/2$$

half complex would cover all the needed combinations.
$\beta \sum_{m=1}^{N_{RF}} \omega_{im} q_m \Box(\ ) => N_{RF}$ complex muls
$\beta^{(i)} \sum_{m=1}^{N_{RF}} \omega_{im} q_m \Box(\ ) => 1$ complex mul Regarding the rest of the multiplications:

$q_m q_k^*$ is already generated in the baseband and D/A converted.

$|\omega_{ik}|^2$, $\omega_{im}\omega_{ik}^*$ will be calculated in SW in the baseband chip and transferred to the RF.

$|q_k|^2$ was already calculated in the direct terms part above—as part of the $\{q_1|q_1|^2, q_2|q_2|^2, \ldots, q_{N_{RF}}|q_{N_{RF}}|^2\}$—and it will be reused for the cross product calculation.

$\omega_{im}q_m$ was already calculated in the direct terms part and will be reused for the cross product calculation.

Summing up this ends up with:

$$2 \cdot N_{RF} + 1/4 \cdot N_{RF} + (N_{RF}^2 - N_{RF})/2 + 1 = \frac{N_{RF}}{4}(2N_{RF}+7)+1$$

complex multiplications per $w_i$ i=1 . . . N instead of just $N_{RF}$ complex multiplications if no pre-distortion functionality was assigned to the RF.

Plugging some numbers shows that for $N_{RF}=4$, the analog precoder needs to employ 16 (complex) multipliers instead of $N_{RF}=4$ multipliers per $w_i$ i=1 . . . N, due to the added pre-distortion functionality:

TABLE 1

| $N_{RF}$ | $N_{RF/4}$ * (2 * $N_{RF}$ + 7) + 1 |
|---|---|
| 4 | 16 |
| 6 | 29 |
| 8 | 47 |
| 10 | 68 |

Note that while an RF operating in baseband domain (I and Q signals) employs per each complex multiplication, an actual 4 real multiplications e.g.

$$\omega_{im} \cdot q_m = (RE \cdot RE - IM \cdot IM) + j(RE \cdot IM - IM \cdot RE)$$

an RF operating in passband domain (IF signals) will employ per each complex multiplication a single real multiplication and another single phase shifter unit, e.g. $q_m$ in its IF version is real multiplied by $|\omega_{im}|$ and also phase shifted by $\Box |\omega_{im}|$.

Therefore, for $N_{RF}=4$, instead of employing 4 real multiplications and 4 phase shifter units (per output signal) with no pre-distortion functionality, 16 real multiplications and 16 phase shifters are used with pre-distortion functionality. The pre-distortion algorithm suggested herein can be extended to higher order non-linearity (e.g. $5^{th}$ order polynomial or any other higher order).

For the direct terms, $2N_{RF}$ multiplications (per $w_i$) are used. The rest of the multiplications e.g. the set of $\{\beta\omega_{i1}|\omega_{i1}|^2, \ldots, \beta\omega_{iN_{RF}}|\omega_{iN_{RF}}|^2\}$ coefficients can be computed in SW in the baseband chip and transferred to the RF for multiplication use. Also the set of signals $\{q_1|q_1|^2, q_2|q_2|^2, \ldots, q_{N_{RF}}|q_{N_{RF}}|^2\}$ will be generated only once in RF and will be used for all output signals $w_i$ i=1 . . . N. Since $N \gg N_{RF}$ the extra negligible number of multiplications for this set is ignored as a $1^{st}$ order approximation.

Figure 5:
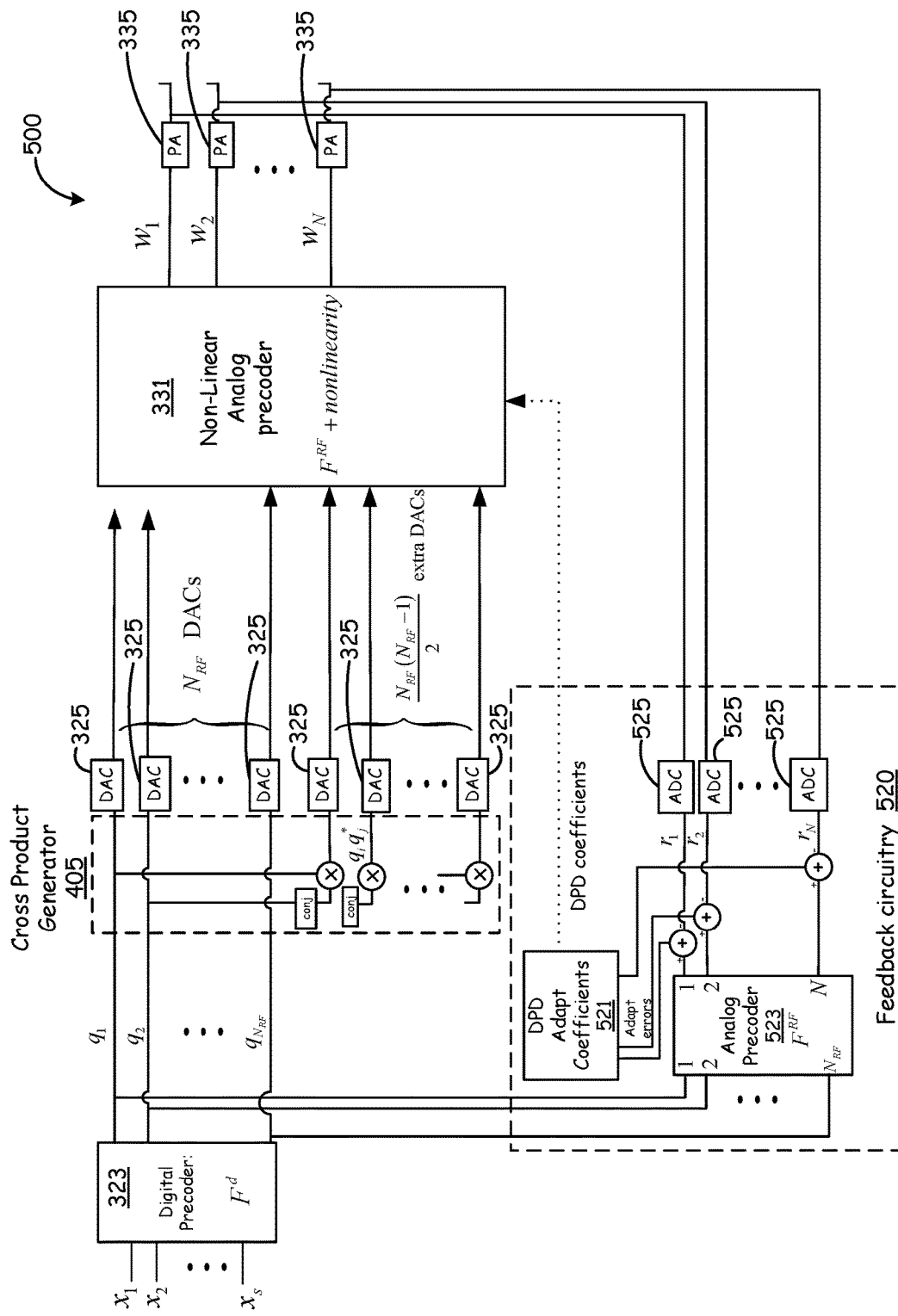
FIG. 5 is a block diagram illustrating use of feedback in a hybrid digital/analog precoder including an analog non-linear precoder, according to various embodiments of the present disclosure.

Referring next to FIG. 5, a hybrid digital/analog precoder 500 employing feedback, will be discussed according to various embodiments of the present disclosure. hybrid digital/analog precoder 500 includes digital precoder 323, which performs the digital portion of the precoding by generating digitally precoded baseband outputs; cross product generator 405, which generates cross products of the digitally precoded baseband outputs; DACs 325, which convert digital baseband and cross product signals to analog for use by analog non-linear precoder 331; analog non-linear precoder 331 which performs the analog portion of the precoding and inserts pre-distortion in a hybrid digital/analog manner before sending the precoded, pre-distorted signal to power amplifiers (PAs) 335; and feedback circuitry 520, which is used to adaptively determine digital pre-distortion (DPD) coefficients based on feedback from PAs 335 and the digital baseband signals output by digital precoder 323.

Feedback circuitry 520 can include an analog precoder 523, analog-to-digital converters (ADCs) 525, and DPD Adaptive coefficients circuitry 521. The outputs of PAs 335 are converted to digital signals using ADCs 525, which can be added to the outputs from analog precoder 523 to generate error signals, which are in turn delivered to DPD Adaptive coefficients circuitry 521, which determines adaptive DPD coefficients. The adaptive DPD coefficients can be supplied to analog non-linear precoder 331, which uses the adaptive DPD coefficients to adjust the pre-distortion compensation. In at least one embodiment, outputs from analog precoder 523 are converted to digital signals before being added to the feedback signals from PAs 335. It will be appreciated that, in at least some embodiments, analog precoder 523 performs the analog part of the precoding for a hybrid digital/analog precoder, so the outputs of digital precoder 323 are not used directly in calculating adaptive DPD coefficients. Furthermore, although not explicitly illustrated, in some embodiments linear precoding calculations performed by analog non-linear precoder 331 can be re-used in place of using a separate linear analog precoder in feedback circuitry 520.

Figure 6:
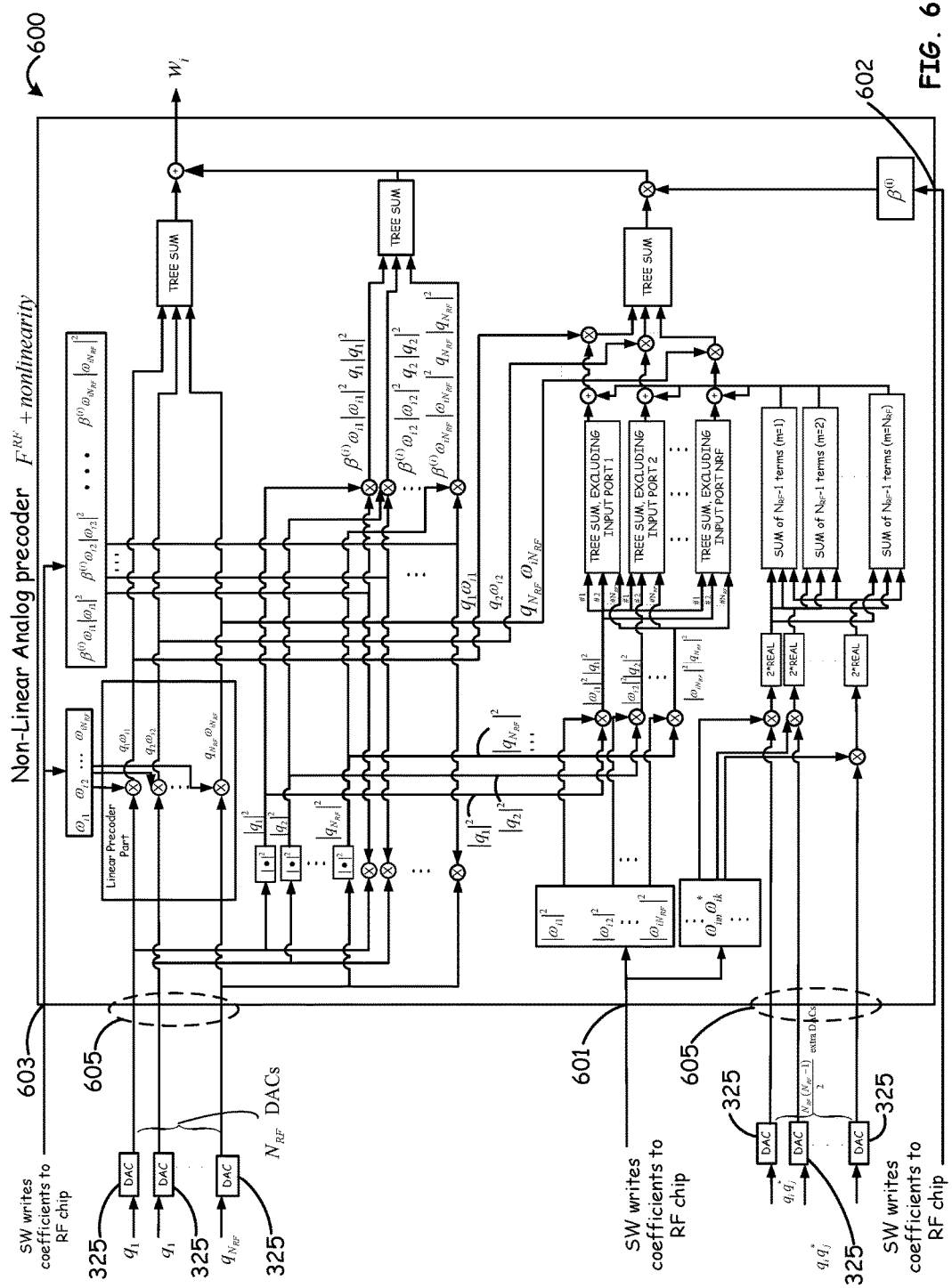
FIG. 6 is a block diagram of an analog non-linear precoder, according to various embodiments of the present disclosure.

Referring now to FIG. 6, an analog non-linear precoder 600 will be discussed according to various embodiments of the present disclosure. Analog non-linear precoder 600 includes one or more inputs 601, 602, and 603 to receive coefficients including precoder coefficients and pre-distortion coefficients. In at least one embodiment, one or more coefficients, or types of coefficients, can be calculated by software in a baseband module or other processor and provided to non-linear analog precoder for use in performing analog precoding and/or pre-distortion functions.

As illustrated in FIG. 6, non-linear precoder 600 includes substantially $N_{RF}$ first inputs 605 to receive converted baseband signals and substantially $$\frac{N_{RF}(N_{RF}-1)}{2}$$

additional inputs 607 to receive converted cross products of those baseband signals from, where $N_{RF}$ corresponds to the number of baseband signals generated by the digital precoder and to be delivered to power amplifiers for transmission using a phased array. In various embodiments, the number of DACS 325 corresponds to the number of first and second inputs.

Analog non-linear precoder 600 combines the precoder and pre-distortion coefficients with the analog-converted baseband signals and the analog-converted cross-products to generate a pre-compensated signal using various combinations of complex multipliers, phase shifters and real multipliers, tree summing modules, matrix determinant modules, and the like.

Figure 7:
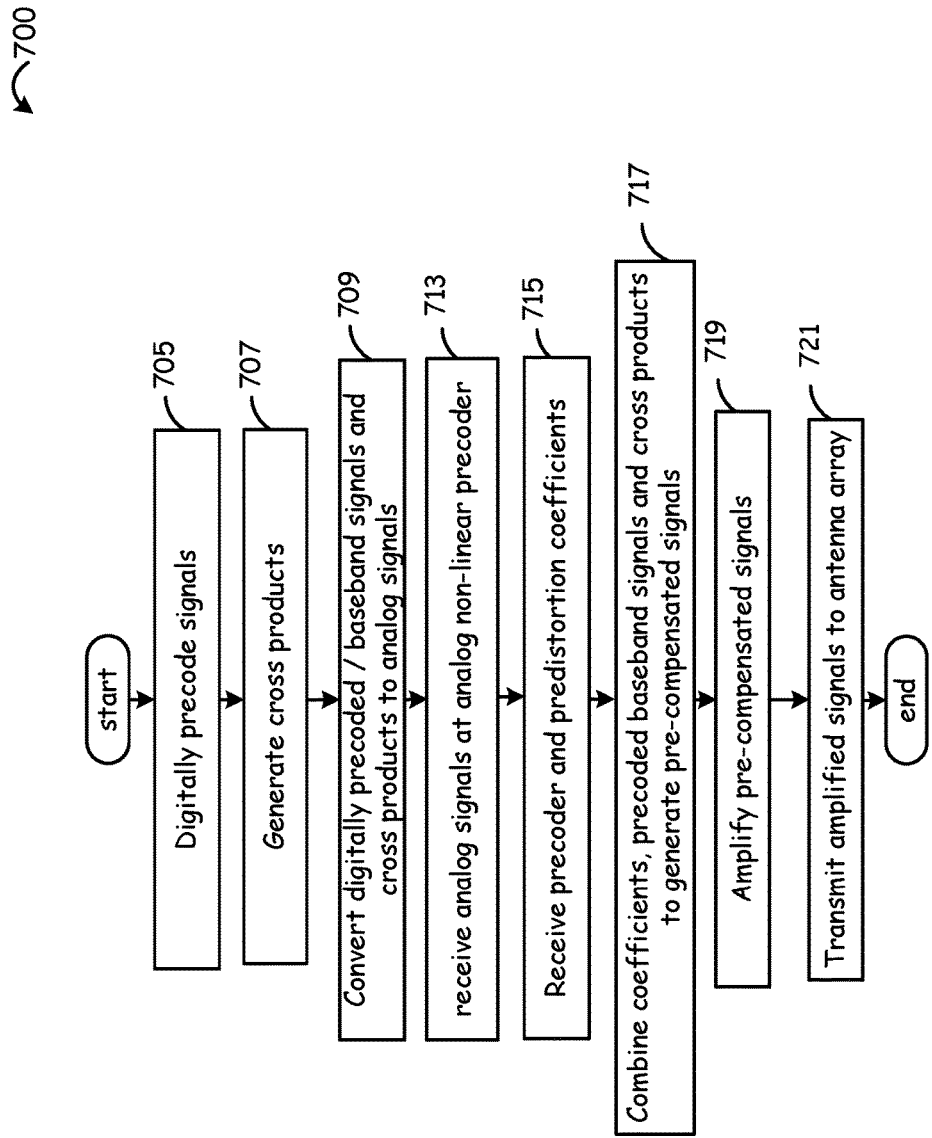
FIG. 7 is a flow chart illustrating a method according to various embodiments of the present disclosure.

Referring next to FIG. 7, a method 700 will be discussed according to various embodiments of the present disclosure. As illustrated by block 705 baseband signals to be transmitted are digitally precoded for beam-forming or other purposes. In at least one embodiment the precoding is performed by a hybrid digital/analog precoder, and the digital precoding is only part of the precoding to be applied to a signal prior to being provided to an antenna array.

As illustrated at block 707, cross products of the digitally precoded baseband signals are generated. Note that in some embodiments, the cross products can be generated within the digital precoder or elsewhere within a baseband chip, while other implementations generate the cross product later in the transmit path. As illustrated by block 709, the cross products and the digitally precoded baseband signals are converted to analog signals using analog to digital converters.

The analog converted signals are received at an analog non-linear precoder, as illustrated by block 713. The analog non-linear precoder also receives precoder and pre-distortion coefficients as illustrated by block 715.

The analog non-linear precoder combines the precoder coefficients, the pre-distortion coefficients, the cross products and the baseband signals to generate a pre-compensated signal, as illustrated by block 717. In various embodiments, this pre-compensated signal has been precoded for beam forming, and adjusted to compensate for non-linearity in the power amplifier to which the signal is to be sent for amplification.

As illustrated by block 719, the power amplifier amplifies the pre-compensated signal. The amplified signal is then transmitted to an antenna array for transmission, as illustrated by block 721.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A system comprising:
   a cross product generator operable to produce a plurality of cross products according to a plurality of data signals, wherein each cross product of the plurality of cross products is associated with a respective pair of data signals in the plurality of data signals; and
   a precoder operable to produce one or more pre-compensated signals according to the plurality of data signals and the plurality of cross products, wherein each pre-compensated signal of the one or more pre-compensated signals is associated with a plurality of coefficients, and wherein each coefficients of the plurality of coefficients is associated with a respective data signal of the plurality of data signals, and wherein the precoder is in an analog precoder portion of an integrated circuit.

2. The system of claim 1, wherein the system comprises a plurality of digital-to-analog converters operable to the convert the plurality of data signals from digital to analog.

3. The system of claim 1, wherein the cross product generator comprises a plurality of complex multipliers associated with the plurality of cross-products.

4. The system of claim 1, wherein the plurality of coefficients associated with each pre-compensated signal of the one or more pre-compensated signals comprises a plurality of precoder coefficients.

5. The system of claim 4, wherein the plurality of precoder coefficients is produced in a digital integrated circuit.

6. The system of claim 1, wherein each pre-compensated signal of the one or more pre-compensated signals is associated with an adaptive pre-distortion coefficient generated according to feedback from one or more RF power amplifiers.

7. The system of claim 1, wherein the system is embedded in an integrated circuit.

8. The system of claim 7, wherein the integrated circuit is a basestation transmitter.

9. The system of claim 1, wherein the cross product generator is in a digital portion of an integrated circuit.

10. A method comprising:
producing, in a cross product generator, a plurality of cross products according to a plurality of data signals, wherein each cross product of the plurality of cross products is associated with a respective pair of data signals in the plurality of data signals; and
produce, in a precoder, one or more pre-compensated signals according to the plurality of data signals and the plurality of cross products, wherein each pre-compensated signal of the one or more pre-compensated signals is associated with a plurality of coefficients, and wherein each coefficients of the plurality of coefficients is associated with a respective data signal of the plurality of data signals, and wherein the precoder is in an analog precoder portion of an integrated circuit.

11. The method of claim 10, wherein the method comprises converting the plurality of data signals from digital to analog using a plurality of digital-to-analog converters.

12. The method of claim 10, wherein the cross product generator comprises a plurality of complex multipliers associated with the plurality of cross-products.

13. The method of claim 10, wherein the plurality of coefficients associated with each pre-compensated signal of the one or more pre-compensated signals comprises a plurality of precoder coefficients.

14. The method of claim 13, wherein the method comprises producing the plurality of precoder coefficients in a digital integrated circuit.

15. The method of claim 10, wherein the method comprises generating one or more adaptive pre-distortion coefficients according to feedback from one or more RF power amplifiers, wherein each pre-compensated signal of the one or more pre-compensated signals is associated with an adaptive pre-distortion coefficient of the one or more adaptive pre-distortion coefficients.

16. The method of claim 10, wherein the method is performed in an integrated circuit.

17. The method of claim 16, wherein the integrated circuit is a basestation transmitter.

18. The method of claim 10, wherein the cross product generator is in a digital portion of an integrated circuit.

* * * * *